United States Patent [19]
Miller

[11] 3,714,816
[45] Feb. 6, 1973

[54] TUBULAR TRANSDUCER AND DRY COUPLANT THEREFOR
[75] Inventor: Darrow L. Miller, Los Angeles, Calif.
[73] Assignee: North American Rockwell Corporation
[22] Filed: April 30, 1971
[21] Appl. No.: 139,116

Related U.S. Application Data

[62] Division of Ser. No. 832,568, June 12, 1969, Pat. No. 3,678,737.

[52] U.S. Cl...................................73/71.5, 73/67.8 R
[51] Int. Cl...............................................G01n 29/00
[58] Field of Search............73/67.5, 67.7, 67.8, 67.9, 73/71.5; 128/2 V, 24 A

[56] References Cited

UNITED STATES PATENTS 3,423,991   1/1969   Collins..................................73/67.5

Primary Examiner—Richard C. Queisser
Assistant Examiner—Arthur E. Korkosz
Attorney—C. F. Dischler

[57] ABSTRACT

A probe for nondestructive testing to identify internal structural defects comprises a tubular piezoelectric element adapted for low frequency vibration while moving in rolling contact over a workpiece surface. A dry adhesive couplant forms a mechanical bond between the piezoelectric element and the workpiece surface, and is also useful with disc-type probes known to the prior art, especially when the adhesive is coated with a layer of minute glass beads.

5 Claims, 4 Drawing Figures

PATENTED FEB 6 1973
3,714,816
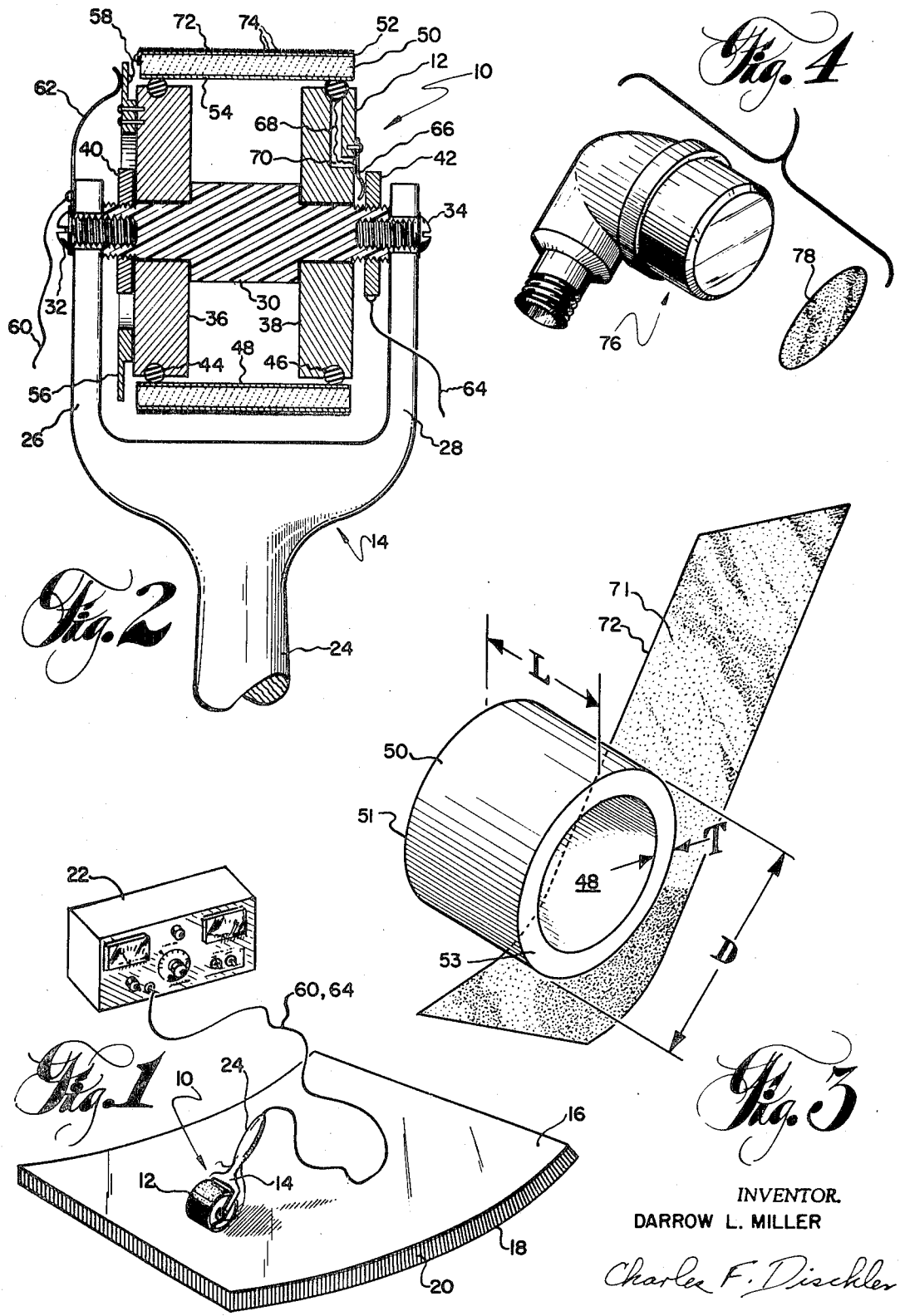
INVENTOR.
DARROW L. MILLER
Charles F. Dischler
ATTORNEY 3,714,816

TUBULAR TRANSDUCER AND DRY COUPLANT THEREFOR

CROSS REFERENCE TO RELATED APPLICATIONS

This application is a division of Ser. No. 832,568, filed June 12, 1969, now U.S. Pat. No. 3,678,737.

BACKGROUND OF THE INVENTION

Acoustical transducers used for ultrasonic inspection are typically of flat disc form, or may be slightly dished or curved as necessary to focus ultrasonic waves such as discussed, for example, in U.S. Pat. No. 2,645,727, issued July 14, 1953. Efficient transmission of energy from a transducer into a workpiece and accurate sensing of reaction effects by such transducers typically require use of a liquid or paste couplant which wets the workpiece surface and the transducer or probe in which it is mounted to couple the two items together acoustically. The probe is normally moved translationally across the workpiece surface in sliding contact therewith, except for the film thickness of the couplant. Workpiece surfaces which are extremely rough or otherwise exhibit high friction in respect of the probe are difficult or impossible to inspect by the foregoing means except by complete immersion of both the probe and the workpiece. Wet coupling methods as required for ultrasonic inspection methods known to the prior art are objectionable for a variety of reasons, including the fact that many couplants are messy, costly, or involve risk of corrosion, contamination, residual traces and other troublesome drawbacks. Moreover, inspection of completed workpieces such as composite panels of the type modernly used in aircraft and space vehicles cannot be conveniently inspected after complete and permanent installation of such panels, especially in the overhead position, due to the impracticality of wetting or immersing the surfaces thereof. Illustratively, some modern supersonic aircraft have as much as 20,000 square feet of steel honeycomb panels in their structure, requiring periodic inspection between flights.

SUMMARY OF THE INVENTION

The invention in this case consists of a tubular or hoop-like shape for a transducer crystal which can be rolled across a specimen surface and which requires no liquid, pastey or gel-like couplants. The tubular piezoelectric element is radially expandable upon application of electrical signal, and is coated with electrically non-conductive dry couplant material over its outer surface for transmitting or receiving mechanical energy into or out of a workpiece while the element is moved in rolling contact over the surface thereof in a direction transverse to the line of contact between the crystal and the workpiece surface. The stated couplant material illustratively comprises glass cloth tape coated on both surfaces with adhesive and on one surface with glass beads from 5 to 25 microns in diameter. Patches of the mentioned tape, when coated with glass beads 10 microns or less in diameter and attached to high frequency pulse-echo ultrasonic probes of sliding type such as shown in FIG. 4 and used in the prior art, have been found in many cases to eliminate the need for liquid or paste couplants or immersing of workpieces and probes as widely practiced heretofor. The tubular probe disclosed herein results in rapid and efficient testing of brazed, welded, and adhesive bonded composite workpieces at low ultrasonic frequencies with high resolving power.

BRIEF DESCRIPTION OF THE DRAWINGS

FIG. 1 shows a general perspective view of apparatus incorporating the inventive concept disclosed herein operatively related to a workpiece for inspecting the same.

FIG. 2 shows a fragmentary view of the probe shown in FIG. 1, partly in cross-section, FIG. 3 shows an isolated perspective view of two structural details from the probe shown in FIGS. 1 and 2, and FIG. 4 shows a perspective view of a typical probe known to the prior art adapted for use with the novel couplant disclosed herein.

DETAILED DESCRIPTION OF THE INVENTION

Referring to FIG. 1, it may be seen that the invention in this case comprises a device for nondestructive testing or inspection which may illustratively take the form of manually operated probe 10 having a rotatable portion 12 mounted in support means 14. Probe 10 is shown in operative relationship with a workpiece of lightweight panel form comprising upper and lower face sheets 16 and 18 with cellular core material 20 secured therebetween. Probe 10 is energized by electrical connection with a suitable source 22 which may take various forms known to the prior art, the details of which are beyond the scope of the invention in this case. Illustratively, source 22 may conform with the power circuitry disclosed in U.S. Pat. application Ser. No. 532,373 filed Mar. 7, 1966.

From FIG. 2, it may be seen that support means 14 may comprise an elongate handle portion 24 integrally formed with two spaced apart brackets or bearing supports 26 and 28 between which a cylindrical tube or rod 30 extends. Rod 30 is preferably of dielectric material and is held stationary by suitable mounting screws 32 and 34 threadably engaged at each end of the rod and securing the same to brackets 26 and 28, respectively. Rod 30 should be sufficiently smooth and inflexible to permit dimensionally stable and low friction contact with the rotatable portions of roller 12 mounted thereon, the requisite properties being illustratively achieved by teflon or other various plastic materials. Roller 12 further includes generally disc shaped elements 36 and 38 of any appropriate material either metallic or non-metallic but preferably one adapted to result in minimum surface wear due to relative movement between rotatable elements 36 and 38 and stationary rod 30. Where necessary or desirable, retaining nuts 40 and 42 may be releasably secured at each end of rod 30 to minimize or prevent lateral displacement of disc supports 36 and 38 relative to rod 30.

As further seen from FIG. 2, roller portion 12 further comprises vibration damping support means 44 and 46 mounted on disc 36 and 38, respectively, and which may take the form of rubber O-rings. Rings 44 and 46 are adapted to make bearing contact with the inner surface 48 of a substantially cylindrical tubular or hoop-like piezoelectric crystal 50. Element 50 comprises a ferroelectric ceramic material of the type commonly used in acoustical probes and the like, characterized by a propensity to distort or deform upon application of an electrical signal thereto. In addition, crystal 50 could in some cases be made from such materials as lead titanate, lead zirconate, or others. To permit application of electrical signals to the crystal, element 50 is preferably plated with any suitable electrically conductive metal or alloy such as silver as suggested by thin metallic coatings 52 and 54. Other characteristics of element 50 are discussed more fully below.

Appropriate means are included in probe 10 for creating an electrical potential between the radially innermost and radially outermost surfaces 52 and 54 of piezoelectric crystal 50. The stated means, in addition to coatings 52 and 54, may illustratively include a metallic or otherwise electrically conductive slip ring 56 affixed to disc support 36 as shown in FIG. 2. Slip ring 56 is connected electrically with outer coating 52 on crystal 50, either by direct contact therewith or by one or more short electrical leads 58 as shown in the figure. Electrical power from source 22 mentioned hereinabove is supplied to slip ring 56 in any convenient manner such as wire 60 secured to a resilient leaf spring 62 held in contacting relationship with ring 56 by mounting screw 32. Electrical contact between source 22 and inner coating 54 or crystal 50 may be achieved by securing wire 64 to electrically conductive retaining nut 42 contacted by leaf spring 66 to which a wire 68 is secured. Wire 68 passes through a passage 70 in disc support 38 and may be wound around a portion of ring 46 to establish contact with coating 54.

From the foregoing discussion, it will be understood that inspection of workpieces such as shown in FIG. 1 is performed by traversing one surface of the workpiece such as face sheet 16 with roller 12 by application of force to handle 24 on probe 10. The action thus achieved is far more rapid and effective than sliding movement of a flat probe such as known to the prior art and shown in FIG. 4, particularly when the contacted surface of a given workpiece is rough, uneven, curved, or characterized by high friction materials.

It will be further understood that acoustical or vibration transmission between crystal 50 and the workpiece mass may be significantly enhanced by the use of one or more couplants, many of which are known and widely used in industry. However, it is a separate and very significant feature of the inventive concept in this case that no liquid, paste or gel-like materials are used as couplants in connection with operation of probe 10. Instead, it has been found that all the problems associated with use of such couplants known to the prior art may be avoided by the novel dry or substantially dry couplant materials discussed below. Thus, the coupling media between crystal 50 and workpiece surface 16 preferably comprises an adhesive coating applied over plating 52. The stated adhesive layer may consist of the relatively tenacious but non-permanent adhesives used on familiar types of masking tape or "Scotch" tape and requiring no moistening to produce their adhesive qualities. Preferably, the adhesives contemplated for use in dry couplant systems disclosed herein are pressure sensitive and viscous in nature, referring to the property of deforming elastically under pressure somewhat in a gel-like manner. Illustratively, the low viscosity adhesives resulting from a mixture of silicone (silicon-oxygen chain) resins and gums in aromatic solvents, preferably without a peroxide catalyst, and which are inherently tacky at room temperature, are satisfactory. It will be understood that dry adhesives of the foregoing type, in the absence of preventive measures, tend to lose their effectiveness due to their propensity for picking up dust, lint, foreign particles and the like from test surfaces. Accordingly, use of such adhesives to provide a mechanical bond between crystal 50 and a test surface, would require clean room conditions and dust-free surfaces. In addition to the mentioned adhesives, other commercially available adhesives may be suitable for the mentioned purpose, the most acceptable among such being those which form a strong but temporary bond between crystal 50 and the workpiece surface. Moreover, the selection of any particular adhesive should include due consideration of the workpiece materials to insure that no tearing or adverse chemical effects result between the adhesive and the workpiece. Where otherwise convenient, the coating of adhesive, instead of being applied to crystal 50, may be applied over the workpiece surface, such as in an intermediate stage of workpiece fabrication, and the probe shown in FIG. 1 could then be used without the tape or glass beads shown in FIG. 2.

Alternatively, it has been found that use of adhesives in forming a substantially dry couplant between crystal 50 and a workpiece surface is considerably facilitated by coating the adhesive surface with a layer of granules or powdered particulates of hard materials such as glass, ceramic, or the like. Illustratively, a coating of glass beads from 5 to 25 microns in diameter have been found to provide very satisfactory results, especially in the lower size range between 5 and 10 microns. Although not essential, the mentioned glass beads may have a coating of silver such as used on the surfaces of weather balloons, motion picture screens, and the like. A relatively thin layer of glass beads in the mentioned size range, when used in the dry couplant system disclosed herein, exhibits certain properties identified with liquids, such as the ability to form a flexible layer which deforms easily as required to conform closely with a contacting surface, especially one having uneven contour or otherwise not perfectly flat. Moreover, the propensity of the adhesive to pick up dust or other particles is avoided by coating the adhesive layer with glass beads or other particulate materials as discussed above.

In the illustrative showing of FIGS. 2 and 3, the dry couplant system consists of a short length of silicone impregnated fiberglass tape 72 coated on each side thereof with a chemically inert adhesive of the type used on conventional masking tape. One side of the tape has a layer of glass beads 74 applied thereover, and the tape is coiled around crystal 50 with diagonal cuts on each end as suggested in FIG. 3. A patch of the same tape when coated with glass beads, 10 microns of less in diameter, may be used on other types of transducer crystals known to the prior art, as suggested by ultrasonic pulse-echo disc type probe 76 and patch 78 in FIG. 4. When thus used, the mentioned couplant system avoids the necessity for liquid couplants currently in widespread use for ultrasonic inspection probes both of the vibration type and the pulse-echo or through transmission type, and may generally be employed up to frequencies of 10 to 15 megahertz with probes known to the prior art.

With further regard to hoop crystal 50 shown particularly in FIGS. 2 and 3, certain performance advantages have been found to result from the dimensional geometry thereof. Thus, application of an electrical signal to crystal 50 will produce deformation of the crystal in three different modes or directional relationships. Thus, a nonuniform or pulsating signal will produce vibration of the crystal due to variation of its length as indicated by dimension L in FIG. 3. Similarly, variation of the crystal diameter will occur as suggested by dimension D in FIG. 3 in addition to variation of wall thickness T of crystal 50. The device contemplated in this case functions best when the length, thickness, and diameter of crystal 50 are so related as to produce a resonant condition of the crystal vibration diametrally at the lowest possible frequency. The foregoing condition is hereinafter referred to as the "hoop resonance" of crystal 50, in which the amplitude is characterized by a somewhat parabolic wave form wherein the two opposite ends 51 and 53 of crystal 50 shown in FIG. 3 have little or no diametral change of dimension and the maximum diametral change in crystal 50 occurs midway between the two stated ends. To produce the foregoing vibration amplitude characteristic, it has been found that the length L of crystal 50 should be less than its diameter D, particularly to avoid having two locations of maximum response along the length of the crystal rather than a single location midway between ends 51 and 53. Moreover, different preselected lengths L of crystal 50 for any specific given diameter have been found to produce a difference in the hoop resonant frequency of the crystal, and the preferred length L of any particular crystal is accordingly that which produces hoop resonance or resonance in the diametral mode, at the lowest possible frequency.

It will be understood that contact between crystal 50 and a flat workpiece surface, for example, occurs along a narrow elongate portion of the outer crystal surface resulting in line contact rather than area contact. Many probes of conventional type such as probe 76 shown in FIG. 4 result in area contact between the probe and the workpiece surface. When in inspecting at frequencies where the wavelength in the material may be relatively long, it is a particular advantage of the arcuate surface of crystal 50 that vastly higher resolving power results from the very short line contact between the transducer and test surface than that characterized by area contact. Thus, a small defect in an extremely localized portion of the contacting surfaces between core material 20 and either of face sheets 16 or 18 in FIG. 1, could not be detected by a conventional low frequency disk probe if the area surrounding such defect were strongly bonded by a defect-free joint. Thus, a conventional probe cannot delineate sharply between separate locations within the contact area, or discern small disbond areas small in size relative to the contact area of the probe. However, rolling movement of crystal 50 across the same types of defects results in a sharp change in energy transmission characteristic between crystal 50 and the workpiece at the precise location of the mentioned contact line wherever any difference of workpiece mass occurs. When used on lightweight panels having very large honeycomb type core material 20, crystal 50 sharply distinguishes each individual cell of the core, as well as disbond areas between the workpiece components. Low frequency flat disc probes having excessive area contact are capable of locating and distinguishing only relatively large disbonds for delaminations in panels of the type shown in FIG. 1. Moreover, the frequencies used for probe 10 discussed above are necessarily rather low, such as 1 to 50 kilohertz, and the discriminating properties of crystal 50 are substantially better than can be obtained with disk probes exciting these same wave lengths in the test structure. Best results are achieved by probe 10 in panel workpieces of the type shown in FIG. 1 using a frequency range of 10 to 50 kilohertz, the precise frequency being that which produces hoop resonance in crystal 50 after the crystal is fully mounted in its support.

In use, it will be understood that crystal 50 is vibrated by the impressed signal from source 22, and that the workpiece contacted by the crystal affects the vibration characteristics of the latter. Due to the foregoing operational property, probe 10 is useful even in contact with workpiece surfaces of rubber, cork, and other highly attenuative non-metallic materials as well as with composite workpieces which are entirely metallic throughout. It will further be understood that the detection of disbonds or other internal structural defects in workpieces by probe 10 involves qualitative comparison of the vibration effects produced on probe 10 by different locations on the same workpiece, notably the areas which are defect free in comparison with those areas containing defects. Moreover, the response characteristics of crystal 50 during rolling movement across a workpiece surface may be read or recorded by a large number of different devices known in the prior art, the choice of which is outside the scope of the inventive concept disclosed herein. In addition, while crystal 50 is shown in the drawings as a single unitary tubular mass, it is within the purview of this case to construct the same in a plurality of arcuate segments joined together to form the tubular shape and/or to join together several hoops along a single rotational axis and by electronic multiplexing techniques facilitate the rapid inspection of large areas without any loss in resolution.

I claim:

1. In a probe system for nondestructively testing a workpiece to locate internal structural defects therewithin:
   a tubular substantially cylindrical transducer element having a length less than its diameter and adapted to vibrate in the diametral mode when impressed by an electrical voltage,
   support means for moving said transducer element in rolling contact with a surface of said workpiece during said vibration and along a line of movement transverse to the roll axis of said tubular transducer, and
   a substantially dry adhesive coating on said transducer element adapted to form a temporary mechanical bond between said element and said workpiece surface along a narrow elongate line of contact therebetween during said rolling movement.

2. In a probe system for nondestructively testing a workpiece to locate internal structural defects therewithin:

a tubular substantially cylindrical transducer element having a length less than its diameter and adapted to vibrate in the diametral mode when impressed by an electrical voltage, support means for moving said transducer element in rolling contact with a surface of said workpiece during said vibration and along a line of movement transverse to the roll axis of said tubular transducer, a substantially dry adhesive coating on said transducer element, and a layer of hard minute granules secured to said adhesive coating.

3. The structure set forth in claim 2 above, wherein: said granules comprise glass beads.

4. A method for nondestructively inspecting a workpiece to determine the presence or absence of internal structural defects therewithin, comprising:

coating a tubular transducer crystal with a dry adhesive to form a mechanical bond between said crystal and the workpiece surface, placing said tubular transducer crystal at a first location on an outer surface of said workpiece, inducing diametrical vibration in a single parabolic waveform in said tubular crystal at a predetermined frequency, moving said crystal across said workpiece surface to a second location thereon while maintaining said crystal in rolling contact with said surface, and noting any changes in said vibrations of said crystal during said movement thereof.

5. The method set forth in claim 4 above, further including:

the step of initially applying a layer of glass beads over said adhesive coating on said crystal prior to said placement of said crystal on said outer workpiece surface.

* * * * *